US008275042B2

(12) United States Patent
Ma et al.

(10) Patent No.: US 8,275,042 B2
(45) Date of Patent: Sep. 25, 2012

(54) HIGH-PERFORMANCE VIDEO TRANSCODING METHOD

(75) Inventors: Zhonghua Ma, North Epping (AU); I-Jan Eric Wang, Carlingford (AU)

(73) Assignee: Canon Kabushiki Kaisha, Tokyo (JP)

( * ) Notice: Subject to any disclaimer, the term of this patent is extended or adjusted under 35 U.S.C. 154(b) by 1001 days.

(21) Appl. No.: 12/260,403

(22) Filed: Oct. 29, 2008

(65) Prior Publication Data

US 2009/0116554 A1 May 7, 2009

(30) Foreign Application Priority Data

Oct. 31, 2007 (AU) ................................ 2007231799

(51) Int. Cl.
*H04N 7/12* (2006.01)

(52) U.S. Cl. ........... 375/240.16; 375/240.18; 375/240.2; 375/240.21

(58) Field of Classification Search ........................ None
See application file for complete search history.

(56) References Cited

U.S. PATENT DOCUMENTS 7,180,944 B2 2/2007 Lin et al. .................. 375/240.16
7,190,724 B2 3/2007 Chen et al. ................. 375/240.2
7,535,515 B2 * 5/2009 Bacche et al. ................ 348/666
2003/0174770 A1 9/2003 Kato et al. ................. 375/240.2
2005/0169377 A1 8/2005 Lin et al. .................. 375/240.16
2005/0281332 A1 * 12/2005 Lai et al. .................. 375/240.03
2010/0246992 A1 * 9/2010 Kempf et al. ................ 382/262

OTHER PUBLICATIONS

Skodras (Skodras, A.N. and Christopoulos, C.A.: "On the Down-Scaling of Compressed Pictures", Proc. of the 1998 IEEE Int. Workshop on Intelligent Signal Processing and Communication Systems (ISPACS'98), pp. 363-367, Melbourne, Australia, Nov. 4-7, 1998).*
Mar. 2, 2009 Examiner's Report in Australian Patent Appln. No. 2007231799.

* cited by examiner

*Primary Examiner* — David Y Jung
(74) *Attorney, Agent, or Firm* — Fitzpatrick, Cella, Harper & Scinto

(57) ABSTRACT

Disclosed is an apparatus (500) for generating a second compressed video stream (550) having a second resolution, from a first compressed video stream (540) having a first resolution. The apparatus comprises means (513) for extracting transform domain luma data and spatial domain chroma data from the first compressed video stream (540), means (514-516) for applying a transform domain operation to the luma data to form reconstructed transform domain luma data, means (518, 519, 560) for applying a spatial domain operation to the chroma data to form reconstructed spatial domain chroma data, and means for scaling the reconstructed transform domain luma data and reconstructed spatial domain chroma data to generate the second compressed video stream.

21 Claims, 7 Drawing Sheets

HIGH-PERFORMANCE VIDEO TRANSCODING METHOD

CROSS-REFERENCE TO RELATED PATENT APPLICATIONS

This application claims the right of priority under 35 U.S.C. §119 based on Australian Patent Application No. 2007231799, filed 31 Oct. 2007, which is incorporated by reference herein in its entirety as if fully set forth herein.

FIELD OF INVENTION

The current invention relates generally to digital video signal processing, and in particular to a method and apparatus for providing a trade-off between the speed and the video quality of video transcoding systems employing video resolution conversion.

BACKGROUND

Digital video systems have become increasingly important in the communication and broadcasting industries. The International Standards Organization (ISO) has established a series of standards to facilitate the standardisation of compression and transmission of digital video signals. One of the standards, ISO/IEC 1318-2 entitled "Generic Coding of Moving Picture and Associated Audio Information" (or MPEG-2 in short, where "MPEG" stands for "Moving Picture Experts Group") was developed in late 1990's. MPEG-2 has been used to encode digital video for a wide range of applications, including the Standard Definition Television (SDTV) and the High Definition Television (HDTV) systems.

A commonly used process in the ISO series of video coding standards is "motion estimation", whose objective is to exploit similarities between adjacent pictures, thus reducing the amount of information that needs to be encoded. Prior to performing the motion estimation process (known as ME), an encoder first sub-divides the current picture into a discrete set of non-overlapping regions known as the coding units. In ME, the encoder examines each coding unit in turn and searches for a region in a previously encoded picture that best matches the current coding unit. Such a region forms the prediction block for the current coding unit. The encoder then computes the pixel-wise difference (which represents the prediction error) between the current coding unit and its prediction block. The encoder also generates a motion vector describing the spatial displacement between the current coding unit and its prediction block. Since a decoder typically reads the motion vector before the prediction error, the prediction error is commonly referred to as the motion residue associated with the motion vector.

In a typical MPEG-2 encoding process, there are three types of pictures defined by the MPEG-2 standard. These picture types are referred to as the "I-picture", the "P-picture", and the "B-picture". Digitized luminance and chroma components of video pixels are first input to the video encoder and stored into macroblock (MB) structures. Then, according to the selected picture type, Discrete Cosine Transform (DCT) and/or ME techniques are used at the MB level to exploit the spatial and temporal redundancy of the video signal thereby achieving compression. Detailed processes for encoding each of three picture types are described as follows.

The I-picture represents an Intra-coded picture that can be reconstructed without referring to the data in other pictures. Luminance and chroma data of each MB unit in an I-picture are first transformed to the frequency domain using a block-based DCT, to exploit spatial redundancy that may be present in the I-picture. Then the high frequency coefficients of each DCT block in the MB unit are coarsely quantized according the characteristics of the human visual system. The quantized DCT coefficients are further compressed using Run-Level Coding (RLC) and Variable Length Coding (VLC) before finally being output into the compressed video bit-stream.

Both the P-picture and the B-picture represent inter-coded pictures that are coded using motion compensation data based upon other pictures.

FIG. 1 illustrates an example of inter-coding of a P picture 101. For an MB 104 which is going to be inter-coded in the current picture 101 in question, the ME technique is used to discover the temporal redundancy with respect to reference pictures. The term "reference pictures" refers to the pictures adjoining the current picture in a temporal order, such as the "previous picture" 102 and the "next picture" 103 in FIG. 1. The ME technique discovers the temporal redundancy by searching in a search area 105 in the reference picture 102 to find a block which minimizes a difference criterion (such as mean square error) between itself and the MB 104 in the current picture 101. The block 106 in the reference picture 102 that minimises the aforementioned difference criterion over the search area 105 is referred to as "the best match block". After locating the best match block 106, the displacements between the current picture 101 and the reference picture 102 along the horizontal direction (X) and the vertical direction (Y) are determined to form a motion vector (MV) 107 which is associated with the MB 104. Then the pixel-wise difference (also referred to as "motion residue") between the current MB 104 and its best match block 106 is spatially compressed using block-based DCT and scalar quantization. Finally, the motion vector and quantized motion residues generated by the above process are entropy-encoded using VLC to form the compressed video bit-stream.

A primary difference between a P-picture and a B-picture is the fact that a B-picture accommodates temporal prediction from future reference pictures whist a P picture does not. The MB 104 in the P-picture 101 only has one MV 107 which corresponds to the best match block 106 in the previous (reference) picture 102. In contrast, a MB in a B-picture (also referred to as a "bidirectional-coded MB") may have two MV values, one "forward MV" which corresponds to the best mapping block in the previous picture (similar to the vector 107 in FIG. 1), and one "backward MV" which corresponds to another best match block in the next picture (i.e., the vector 109 pointing to the block 108 in the reference picture 103). The motion residue of a bidirectional-coded MB is determined as an average of the motion residues produced by the forward MV and by the backward MV.

With the diversity of digital video applications, it is often necessary to convert a compressed MPEG-2 bit-stream from one resolution to another. Examples of such applications include conversion from HDTV to SDTV, and conversion from one bit-rate to a different bit-rate for re-transmission. In this description the input (having a first resolution) to a resolution conversion module is referred to as the "input stream" (or input compressed stream if appropriate), and the output (having a second resolution) from the resolution conversion module is referred to as the "scaled output stream" (or scaled compressed output stream if appropriate).

A straightforward solution for implementing the aforementioned resolution conversion applications is a "tandem transcoder", in which a standard MPEG-2 decoder and a standard MPEG-2 encoder are cascaded together to provide the required resolution and bit-rate conversions. However, the process of fully decoding and subsequently encoding MPEG-2 compressed bit-streams demands heavy computational resources, particularly due to the computationally-intensive ME operations in the standard MPEG-2 encoder Therefore the tandem transcoding approach is not considered to be an efficient solution for resolution or bit-rate conversion of compressed bit-streams.

Spatial-Domain Downscaling Transcoder

Recently new types of video transcoders have been proposed to address the computational complexity of the tandem solution. For instance, the computation burden of a standard MPEG-2 encoder has been significantly reduced by bypassing the computationally-intensive ME operations for the current coding unit and predicting its "encoding parameters" directly from "side information" extracted from the input compressed bit-streams. Herein the encoding parameters usually refer to the encoding mode (such as intra-coded, inter-coded, or bidirectional-coded), and the MV value associated with the current MB. The side information may include the encoding mode, the MV value, the motion residues, and quantization parameters associated with each MB unit in the input compressed bit-stream.

FIG. 2 is a block diagram of a first principle transcoder 200 for resolution downscale conversion. The transcoder 200 comprises a video decoding part 210, a spatial downscaling part 220, and a reduced-scale video encoding part 230.

Referring to FIG. 2, a compressed input video bit-stream 240 in a first resolution (eg an MPEG-2 compliant HDTV bit-stream) is input into the decoding part 210. Within 210 the input compressed bit-stream is parsed by a variable length decoding (VLD) module 211 (which is one version of an entropy decoder) to produce quantized DCT coefficient blocks 242. Then 242 are inversed quantized (IQ) in a step 212, the output (243) of which is inverse DCT transformed (IDCT) in a step 213 to produce the pixel motion residues 244. Meanwhile, motion data 246, which includes "motion prediction mode" (which may for example be forward prediction, backward prediction, and bidirectional prediction) and associated motion vector values, is extracted by the module 211 from the input bit-stream 240 and fed into a motion compensation (MC) module 215. According to the motion data 246, a set of compensated pixel data 245 is generated in 215 from reference pixel data 248 stored in a frame store (FS) 216. The compensated pixel data 245 from the module 215 is summed with the corresponding pixel motion residue 244 from step 213 in a summing unit 214, the output of which is a set of reconstructed pixel data 247 (such as YUV 4:2:0 pixel data in a HDTV resolution). There is also a feedback from summing unit 214 to the FS 216 which stores reconstructed pixel data 247 for further MC operations.

In the exemplary downscale transcoder 200, the pixel data 247 and motion data 246 both of which are outputs from 210, are input into the downscaling part 220 to reduce their resolution from the first resolution (eg HDTV resolution) to a second resolution (eg SDTV resolution). Within 220, the pixel data 247 is processed by a downscaling (DS) module 221 in the pixel domain by means of spatial downsample filtering according to the downscale ratio. The output of the downscaling module 221 is downscaled pixel data 249 in the second resolution (i.e., YUV 4:2:0 pixel data in a SDTV resolution). The motion data 246 is processed a motion resampling (MR) module 222, wherein a resampled version of the motion data 246, denoted as 251, is produced according to the downscale ratio. This resampled motion data 251 is used for encoding of a compressed video bit-stream in the second resolution by the video encoding part 230.

The encoding part 230 of the exemplary transcoder is a truncated-version of a standard MPEG-2 encoder. It uses the resampled motion data 251 from downscaling module 220 directly to avoid the computationally expensive ME process. An MC module 237 inputs the resampled motion data 251 and generates compensated pixel data 252 from reference frame data 255 which is stored by a frame storage module 235. Then in a difference module 231 the difference between the downscaled pixel data 249 and the compensated pixel data 252 is determined, and the output of 231, denoted as 253, is DCT transformed in a DCT module 232. The output from the DCT module 232, denoted by a reference numeral 257, is further quantized (Q) in module 233 to match the required output bitrate. Finally the output from 233, denoted as 258, is processed by a VLC module 234 to produce a compressed stream 250 in the scaled resolution. Meanwhile, the module 234 also generates a set of bit-budget statistics data 262 for a rate control (RC) module 239, which, in turn, produces a right quantization step 259 for quantization module 233 to quantize subsequent coding units.

Besides generating the scaled compressed video stream 250, the encoder part 230 also has an in-loop decoding pass. The output from the quantization module 233, denoted as 258, is inverse-quantized in an IQ module 236, the output of which is denoted as 261. This output 261 is then IDCT transformed in a module 238. The output 254 of the IDCT module 238 is the reconstructed motion residue which is summed with the output 252 from the MC module 237 in a summer 241, the output of which is input, as depicted by an arrow 256, for storage in a frame storage unit 235 for MC processing of subsequent coding units.

The overall architecture of the exemplary transcoder 200 is still very complicated due to its redundant IDCT and DCT operations (i.e., 213, 232, and 238) which are needed for spatial domain MC processing. Therefore, such a downscale transcoder structure is unlikely to be preferred in real-time transcoding applications where speed and efficiency become major concerns.

DCT-Domain Downscaling Transcoder

DCT-domain transcoders have been developed to address the complexity of their spatial domain counterparts by moving the entire motion compensation and reference frame storage process to the DCT domain. The motion compensation in the DCT domain (MC-DCT) is performed on the basis of 8×8 DCT coefficient blocks, and generates the prediction of the current luma/chroma DCT coefficient block by shifting the reference blocks using matrix-based operations according to the motion displacement. The motion compensated block data is stored using frame storage in the DCT domain (FS-DCT) and summed with the motion residues in the DCT domain if possible. As such, the DCT domain transcoder is able to avoid the redundant DCT/IDCT operations imposed by the spatial domain solution, thus simplifying the overall transcoding framework.

FIG. 3 is the block diagram of a first principle DCT-domain transcoder 300 for resolution downscale conversion. The entire transcoder comprises three main parts, that is, a DCT-domain decoding part 310, a DCT-domain downscaling part 320, and a DCT-domain encoding part 330.

Referring to FIG. 3, a video stream 340 pre-compressed in a first resolution (this being equivalent to 240 in FIG. 2) is input into the decoding part 310. Within 310 the input stream is first parsed by a VLD module 311 to extract quantized DCT coefficient blocks 341 and motion data 342 (this being equivalent to 246 in FIG. 2). The DCT coefficient blocks 341 are inversed quantized in module 312 which outputs DCT-domain motion residue 343. The motion data 342 is input into a motion-compensation-in-DCT-domain (MC-DCT) module 314 to produce compensated DCT coefficient blocks 344 based on reference DCT coefficients 346 which are stored in a frame-store-in-DCT-domain (FS-DCT) 315. Then, the compensated DCT coefficient blocks 344 and corresponding DCT-domain motion residue 343 are summed in the DCT domain in a summing unit 313. The output of 313, denoted as 345, is the reconstructed DCT coefficient blocks 345 (i.e., 8×8-size DCT coefficient blocks) which are the primary output of the module 310. The reconstructed DCT blocks 345 are also stored in the FS-DCT unit 315 for MC processing of subsequent coding units.

The output of the decoding part 310, which includes the motion data 342 and the reconstructed DCT blocks 345, is processed in the part 320 to convert from the original resolution (eg HDTV resolution) to a second resolution (eg SDTV resolution). Within 320, the DCT coefficient blocks 345 are processed by a downscaling-in-DCT-domain (DS-DCT) unit 321 which performs resolution conversion in the DCT domain by means of frequency truncation according to the downscaling ratio. The output 349 of the module 321 is downscaled DCT coefficient data which is organized in a block-wise structure in the same manner as 345. The motion data 342 is resampled in a module 322 (which is same as the module 222 FIG. 2) according to the downscale ratio. The output 351 of the module 322 is re-sampled motion data which is to be used for encoding the compressed video bitstream in the second resolution.

The encoding part 330 of the exemplary DCT domain transcoder 300 is a DCT domain counterpart of the encoding part 230 in FIG. 2. It takes two inputs, the downscaled DCT coefficients 349 and the re-sampled motion data 351, both of which are generated by the downscaling part 320. The re-sampled motion data 351 is used by an MC-DCT module 332 to generate compensated DCT coefficient data 353 based on reference DCT coefficients 357 which are stored in FS-DCT 333. Then, in a difference module 331 the compensated DCT coefficient data 353 is subtracted from the downscaled DCT coefficients 349. The output 352 from the difference module 331 is the DCT-domain motion residue 352 which is associated with the re-sampled motion data 351. The motion residue 352 is quantized in a module 334 and further processed by a VLC module 335 before being output as the scaled compressed stream 350. Meanwhile, bit-budget statistics data 358 generated by the VLC module 335 is fed back to a rate control module 337 to generate new quantization value 359 for use by the module 334 in quantizing subsequent coding units.

Similar to the part 230 in FIG. 2, the encoding part 330 herein includes an in-loop decoding pass. The quantized DCT coefficient 354 from the module 334 is inverse-quantized in an IQ module 336. Then, in another summation module 359, the output 355 from the module 336 is summed with the output 353 from the MC-DCT module 332. The output 356 of the summer 359 is reconstructed DCT coefficients 356 in the second resolution, which is stored in the FS-DCT 333 for use in MC-DCT processing of subsequent coding units.

By using a set of DCT domain operations such as MC-DCT 314, FS-DCT 333, and DS-DCT 321, the exemplary transcoder 300 avoids the redundant DCT/IDCT operation required by its spatial domain counterpart 200. This results in a dramatic simplification of the overall architecture.

A major effort has been expended to further boost the operation efficiency of the MC-DCT operation 314. One approach is to simplify the MC-DCT operation by using factorized sparse matrix manipulations to replace the original brute-force MC-DCT matrix operations. Other approaches involves approximating MC-DCT operations by using only a subset of each DCT coefficient block (i.e., the 4×4 left-top part of a 8×8 DCT block) or by binary-approximating the MC-DCT operation matrices. However, the resultant speed improvement is often offset by the noticeable luminance and chroma video quality degradation in high motion areas of P/B pictures.

Therefore, there is a need for a high-performance video downscale transcoder which achieves a better operation speed than current approaches, while being able to retain high video quality for chroma data.

SUMMARY

An object of the present invention is to provide a method and apparatus for downscaling transcoding of the compressed video stream which avoids the accumulation of colour drift in video reproduction while enabling further speedup in operation.

Disclosed are arrangements, referred to as "split-processing" (or SP) arrangements, which seek to address the above problems by doing the following (1) Motion compensating and downscaling low-volume chrominance data (also referred to as chroma data) in the spatial domain. This aims to prevent error propagation and color drift due to the rounding error that would otherwise be introduced by applying motion compensation in a transform domain to low-volume chroma data. It also avoids the high computation complexity of motion compensating field-predicted chroma blocks in the transform domain.

(2) Motion compensating and downscaling high-volume luminance data in a transform domain (e.g. DCT domain). This aims to boost the operation speed by applying approximation approaches to motion compensation in the transform domain of selective frames or macroblocks while maintaining negligible video quality degradation in the luminance (also referred to as luma) component. Moreover, motion compensation and downscaling operations can be efficiently integrated in the transform domain, which enables further improvement of the operation speed.

According to a first aspect of the present invention, there is provided a method for generating a second compressed video stream having a second resolution, from a first compressed video stream having a first resolution, said method comprising:

extracting transform domain luma data and spatial domain chroma data from said first compressed video stream;

applying a transform domain operation to said luma data to form reconstructed transform domain luma data;

applying a spatial domain operation to said chroma data to form reconstructed spatial domain chroma data; and scaling said reconstructed transform domain luma data and said reconstructed spatial domain chroma data to generate said second compressed video stream.

According to another aspect of the present invention, there is provided a method for generating a second compressed video stream having a second resolution, from a first compressed video stream having a first resolution, said method comprising:

separating luma transform data and chroma transform data from said first compressed video stream;

applying a first reconstructing operation in a transform domain to said luma transform data to form reconstructed luma transform data;

obtaining chroma data by inverse transforming said chroma transform data;

applying a second reconstructing operation to said chroma data to form reconstructed chroma data; and generating said second compressed video stream by scaling and encoding said reconstructed luma transform data and said reconstructed chroma data.

According to another aspect of the present invention, there is provided a method of generating a scaled version of compressed video stream from a compressed video stream, said method comprising:

separating the luma and chroma data from said compressed video stream;

processing said luma data in the transform domain using transform domain motion compensation and transform domain scaling operations;

processing said chroma data in the spatial domain using spatial motion compensation and spatial scaling operations; and combining said processed luma and chroma data to generate said scaled version of compressed video stream.

According to another aspect of the present invention, there is provided a method of generating a scaled version of video data from a compressed video stream, said method comprising:

processing luma data in the transform domain using transform domain motion compensation and transform domain scaling operations; and processing chroma data in the spatial domain using spatial motion compensation and spatial scaling operations.

According to another aspect of the present invention, there is provided an apparatus for generating a second compressed video stream having a second resolution, from a first compressed video stream having a first resolution, said apparatus comprising:

means for extracting transform domain luma data and spatial domain chroma data from said first compressed video stream;

means for applying a transform domain operation to said luma data to form reconstructed transform domain luma data;

means for applying a spatial domain operation to said chroma data to form reconstructed spatial domain chroma data; and means for scaling said, reconstructed transform domain luma data and said reconstructed spatial domain chroma data to generate said second compressed video stream.

According to another aspect of the present invention, there is provided an apparatus for generating a second compressed video stream having a second resolution, from a first compressed video stream having a first resolution, said apparatus comprising:

a memory for storing a program;

a processor for executing the program, said program comprising:

code for extracting transform domain luma data and spatial domain chroma data from said first compressed video stream;

code for applying a transform domain operation to said luma data to form reconstructed transform domain luma data;

code for applying a spatial domain operation to said chroma data to form reconstructed spatial domain chroma data; and code for scaling said reconstructed transform domain luma data and said reconstructed spatial domain chroma data to generate said second compressed video stream.

According to another aspect of the present invention, there is provided a computer program product including a computer readable medium having recorded thereof a computer program for directing a processor to execute a method for generating a second compressed video stream having a second resolution, from a first compressed video stream having a first resolution, said program comprising:

code for extracting transform domain luma data and spatial domain chroma data from said first compressed video stream;

code for applying a transform domain operation to said luma data to form reconstructed transform domain luma data;

code for applying a spatial domain operation to said chroma data to form reconstructed spatial domain chroma data; and code for scaling said reconstructed transform domain luma data and said reconstructed spatial domain chroma data to generate said second compressed video stream.

Other aspects of the invention are also disclosed.

The foregoing has outlined rather broadly the features and technical advantages of the SP arrangements. Additional features and advantages of the SP arrangements are described hereinafter. Those skilled in the art will appreciate that they may readily use the disclosed SP arrangements as a basis for modifying or designing other structures for achieving similar results. Those skilled in the art will also realize that such equivalent constructions do not depart from the spirit and scope of the SP approach.

BRIEF DESCRIPTION OF THE DRAWINGS

One or more embodiments of the present invention will now be described with reference to the drawings in which.

DETAILED DESCRIPTION INCLUDING BEST MODE

Matrix format of MC-DCT Operation

Figure 1:
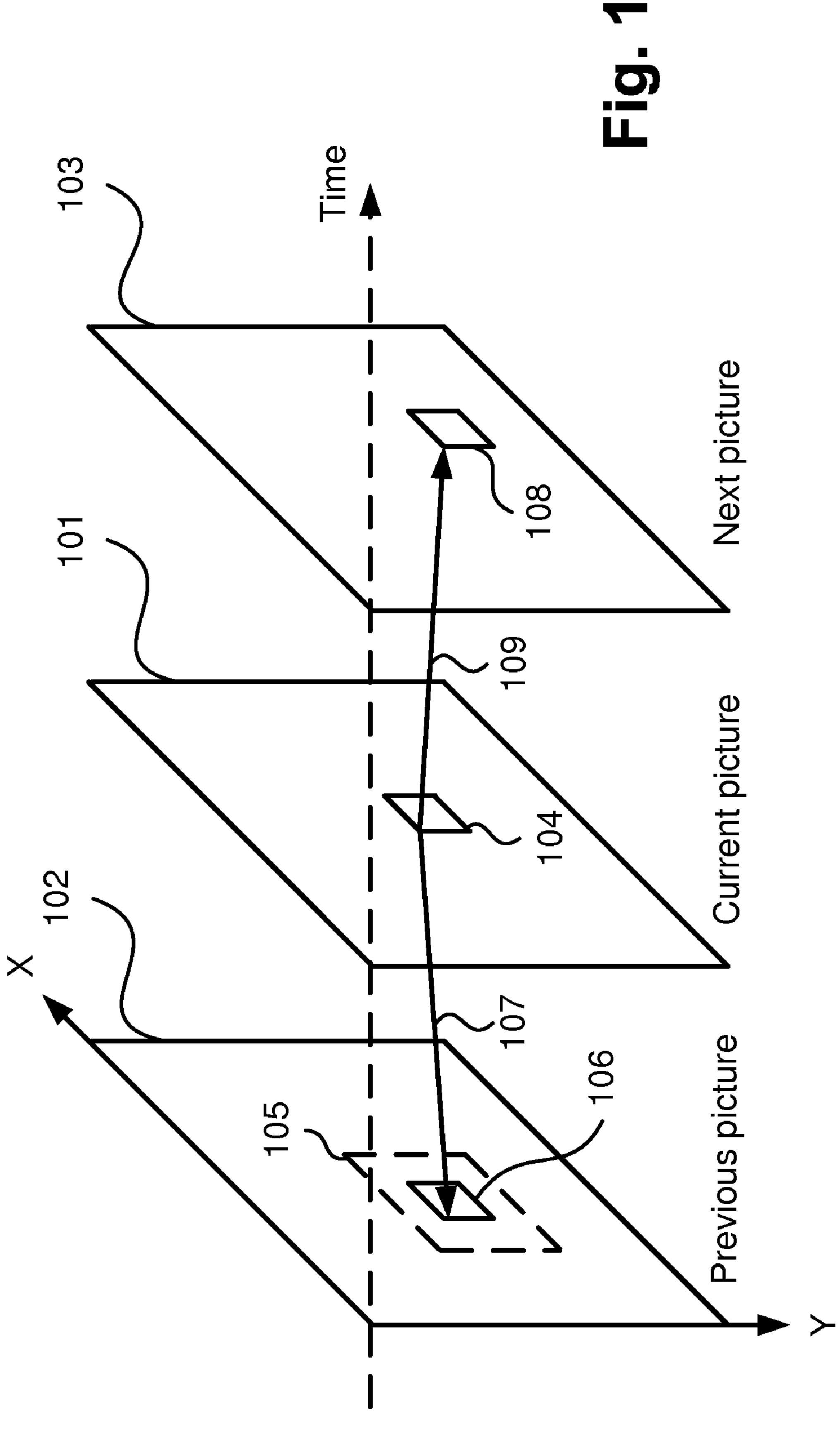
FIG. 1 depicts motion prediction of a macroblock in a current frame from a mapping block located in reference frames.

Before introducing the methodology of the MC-DCT operation, a review of DCT/IDCT operation in matrix format is presented. Let $x=\{x(m,n)\}_{m,n=0}^{7}$ denotes an 8×8-size block of pixel and let $X=\{X(k,l)\}_{k,l=0}^{7}$ denote a 8×8-size block of DCT coefficients, a two dimensional (2D) 8×8-size DCT converts the pixel block x to the DCT block X as follows:

$$X(k,l)=\frac{c(k)c(l)}{4}\sum_{m=0}^{7}\sum_{n=0}^{7}x(m,n)\cos\left(\frac{2m+1}{16}k\pi\right)\cos\left(\frac{2n+1}{16}l\pi\right) \quad (1)$$

Where $c(0)=1/\sqrt{2}$ and $c(k)=1$. The conversion from the DCT block to the pixel block x is accomplished by an IDCT given by the following:

$$x(m,n)=\sum_{k=0}^{7}\sum_{l=0}^{7}\frac{c(k)c(l)}{4}X(k,l)\cos\left(\frac{2m+1}{16}k\pi\right)\cos\left(\frac{2n+1}{16}l\pi\right) \quad (2)$$

Now let $$s(k,n)=\frac{c(k)}{2}\cos\left(\frac{2n+1}{16}k\pi\right)$$

and define $S=\{s(k,n)\}_{k,n=0}^{7}$ as a one dimensional (1D) 8-sample DCT transform matrix. Then the 2D DCT transform (1) can be expressed in a matrix format as follows:

$$X=SxS^T, \quad (3)$$

And the 8×8 2D-IDCT (2) can be expressed as follows:

$$x=S^TXS \quad (4)$$

according to the unitary nature of the DCT transform matrix S (where superscript T denotes a matrix transposition).

Figure 4:
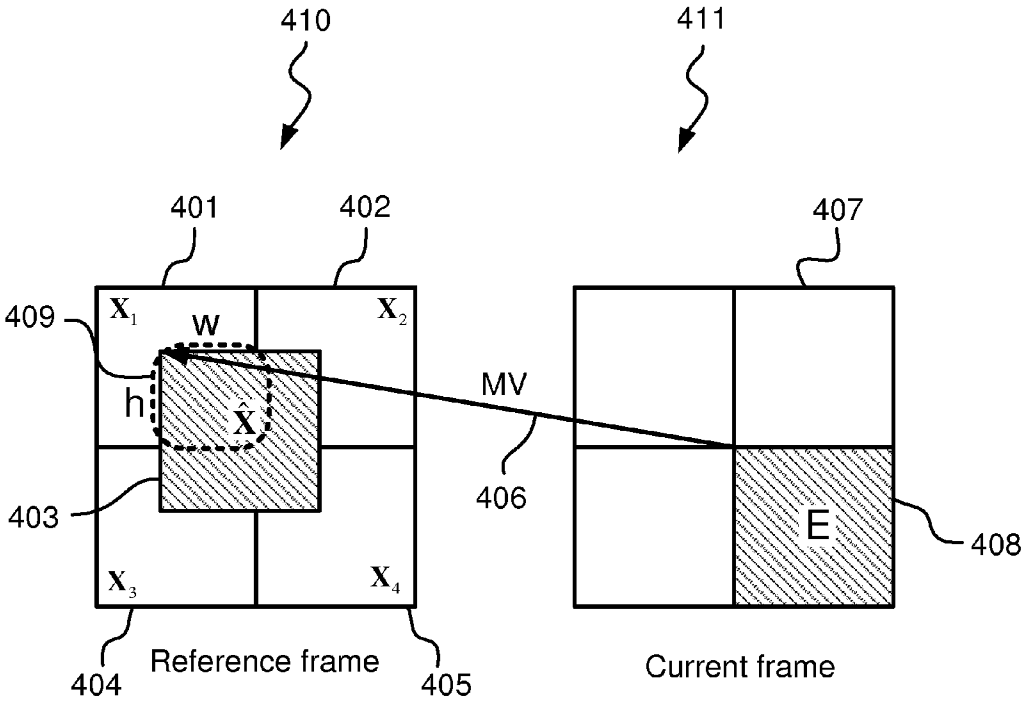
FIG. 4 depicts the basic concept of MC-DCT operation.

FIG. 4 depicts the basic concept of an MC-DCT operation. The output of the MC-DCT operation is an 8×8 DCT block, denoted as $\hat{X}$ (403). This block 403 is generated dependent upon a motion vector MV (406) which reflects displacement from a motion residue block E (408) in a current frame 411. The block 403 is thus generated dependent upon four 8×8 DCT coefficient blocks, $\{X_i\}_{i=1}^{4}$ (401, 402, 404, 405), that are partially covered by the $\hat{X}$ (403) in a reference picture (or frame) 410.

Referring to FIG. 4, and considering the integer-pel motion first, assume the intersection of the block $\hat{X}$ (403) with the DCT block $X_1$ (401) forms an h×w sub-block (409), where $1\leqq h, w\leqq 8$ are respectively the height and the width of the sub-block (409). This implies that the intersections of $\hat{X}$ (403) with $X_2$ (402), $X_3$ (404), and $X_4$ (405) are sub-blocks of h×(8−w), (8−h)×w, and (8−h)×(8−w) respectively. Therefore, a spatial-domain counterpart of the block $\hat{X}$ (403), denoted as $\hat{x}$, can be obtained as a superposition of appropriate windowed and shifted versions of $\{x_i\}_{i=1}^{4}$ (which are spatial-domain counterparts of $\{X_i\}_{i=1}^{4}$) as follows:

$$\hat{x}=U_hx_1L_w+U_hx_2L_{8-w}+U_{8-h}x_3L_w+U_{8-h}x_4L_{8-w} \quad (5)$$

where $$U_n=\begin{bmatrix}0 & I_n\\ 0 & 0\end{bmatrix} \text{ and } L_n=\begin{bmatrix}0 & 0\\ I_n & 0\end{bmatrix}$$

for n=1, 2, . . . , 8, and $I_n$ represents a n×n-size identity matrix. Provided that that $x_i=S^TX_iS$ (according IDCT transform (4)), equation (5) can be rewritten as follows:

$$\hat{x}=U_hS^TX_1SL_w+U_hS^TX_2SL_{8-w}+U_{8-h}S^Tx_3SL_w+U_{8-h}S^TX_4SL_{8-w}. \quad (6)$$

The value of $\hat{X}$ (403) is finally obtained via a 2D-DCT transform, i.e., $\hat{X}=S\hat{x}S^T$.

When the motion vector is at the half-pel scale (as in MPE-2 standard), the intersection between $\hat{X}$ (403) and $X_1$ (402) forms a sub-block of $$\left(h+\frac{1}{2}\right)\times\left(w+\frac{1}{2}\right)$$

size (where h and w are integers). Therefore, the value of $\hat{x}$ has to be obtained by averaging four separate contributions corresponding to the displacement pairs (h, w), (h+1, w), (h, w+1), and (h+1,w+1), that is, $\hat{x}$ is given by the following:

$$\hat{x}=\left(\frac{U_h+U_{h+1}}{2}\right)S^TX_1S\left(\frac{L_w+L_{w+1}}{2}\right)+\left(\frac{U_h+U_{h+1}}{2}\right)S^TX_2S\left(\frac{L_{8-w}+L_{7-w}}{2}\right)+\left(\frac{U_{8-h}+U_{7-h}}{2}\right)S^TX_3S\left(\frac{L_w+L_{w+1}}{2}\right)+\left(\frac{U_{8-h}+U_{7-h}}{2}\right)S^TX_4S\left(\frac{L_{8-w}+L_{7-w}}{2}\right). \quad (7)$$

As long as all the DCT shifting matrices $$S\left(\frac{U_n+U_{n+1}}{2}\right) \text{ and } S\left(\frac{L_n+L_{n+1}}{2}\right)$$

can be generated offline, the MC-DCT operation cost of half-pel motions retains a complexity level which is the same or similar to that of integer motions.

Nevertheless, MC-DCT operation is cost-inefficient in handling interlace video data which often exists in an MPEG-2 compressed video stream. This is because that MC-DCT operation is conducted on the basis of 8×8 DCT block size, whilst interlaced video is usually encoded using field predicted macroblocks and consists of 8×4-size of chroma block data. Consequently, highly complicated matrix operations have to be used to adapt the MC-DCT to work on 8×4-size blocks, at the price of extra computation cost. Moreover, the field-to-frame conversion in the DCT domain also degrades the situation, as the conversion involves matrix manipulations rather than a simple scan-order alternation as to the spatial domain MC process.

Round Drift in the MC-DCT Operation

Spatial domain MC operation in a standard MPEG-2 video codec involves integer rounding operations. When half-pel motion vectors are used to predict the reference pixels from reference pictures, the predicted sub-pel pixel value is usually interpolated from its nearest neighbours and truncated to the nearest integer value. However, such a rounding operation is high nonlinear in the spatial domain and there is no equivalent counterpart operation in the DCT domain. As a result, mismatch occurs between the output of a standard decoder using spatial domain MC operation and a DCT-domain decoder using MC-DCT operation, even though the input compressed video stream is exactly the same.

Let consider encoding of a P picture in a standard MPEG-2 decoder. Denoting u, v, and w as the input pixel data (249), the local reconstructed pixel data (252), and generated DCT coefficient (258) just before VLC coding (234). The encoding process of the input pixel data u can be given by the following:

$$w_n=Q(DCT(u_n)-RND(MC^S(v_{n-1}))),$$

$$v_n=IDCT(IQ(w_n)+RND(MC^S(v_{n-1}))) \quad (8)$$

where n is the current picture index, and DCT(•), IDCT(•), Q(•), IQ(•), and $MC^S$(•) denotes the DCT (232), IDCT (238), Quantization (233), Inverse Quantization (236), MC operations (237) in the spatial domain, respectively. RND(•) denotes the rounding operation embedded in the MC operation, which is activated only if a half-pel motion vector is used for MC operations.

Figure 2:
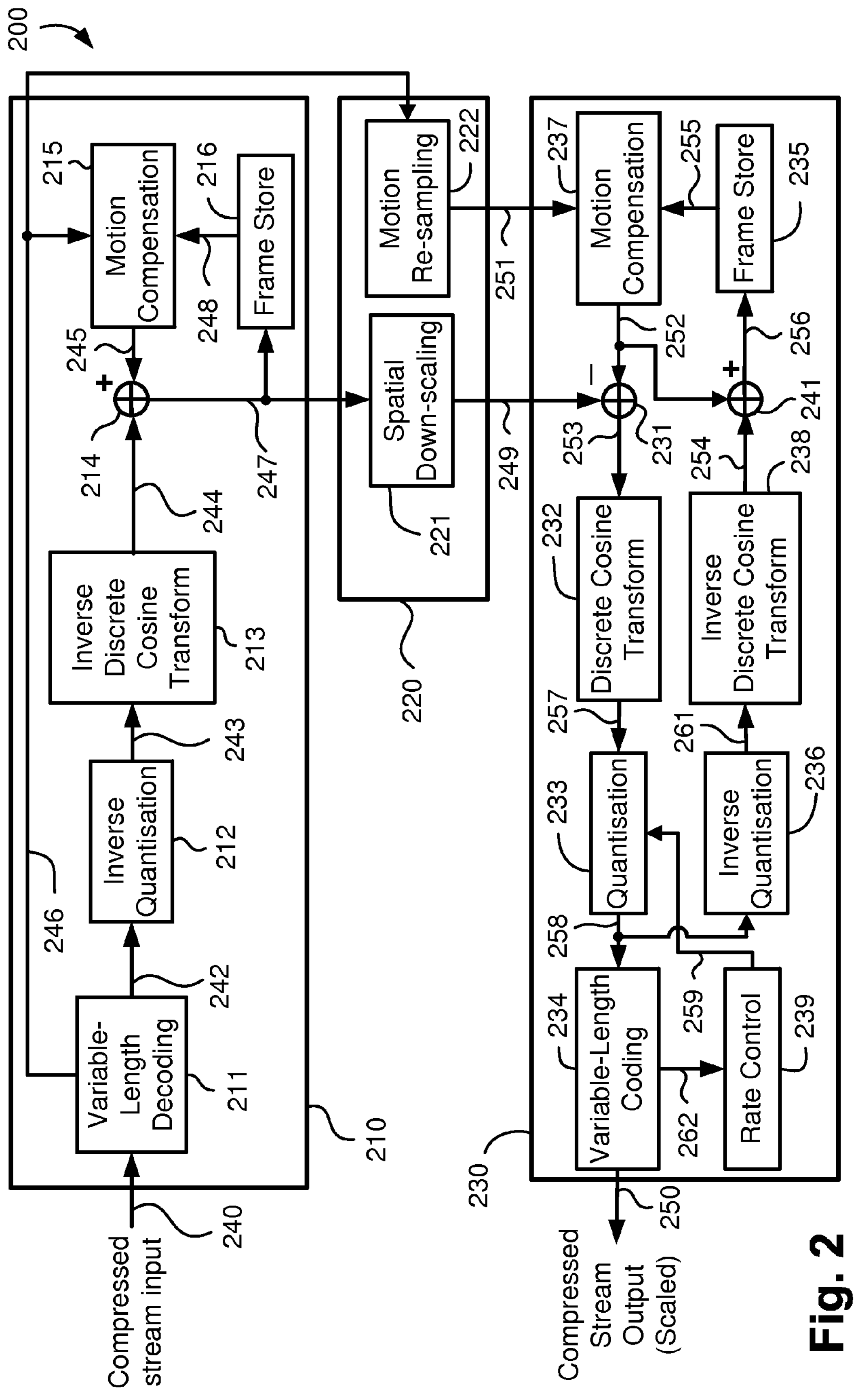
FIG. 2 is a block diagram of a current spatial domain downscaling transcoder.

Now consider decoding the pre-encoded data $w_n$ using a standard MPEG-2 decoder (i.e., the part 210 of FIG. 2). Let $w^S$ and $x^S$ denote the input DCT coefficient (242) parsed by the VLD module (211) and reconstructed pixel data (247), respectively. Due to the fact that VLC (234) and VLD (211) pair are informational losses operations, the decoding process of the input coefficient $w^S$ is given by $$w_n^S = w_n,$$

$$x_n^S = IDCT(IQ(w_n^S)) + RND(MC(x_{n-1}^S)) \qquad (9)$$

By comparing (9) with (8), it is obvious that $x_n^S$ always equals to $v_n$. Therefore, there is perfect video reconstruction at the decoding side.

Figure 3:
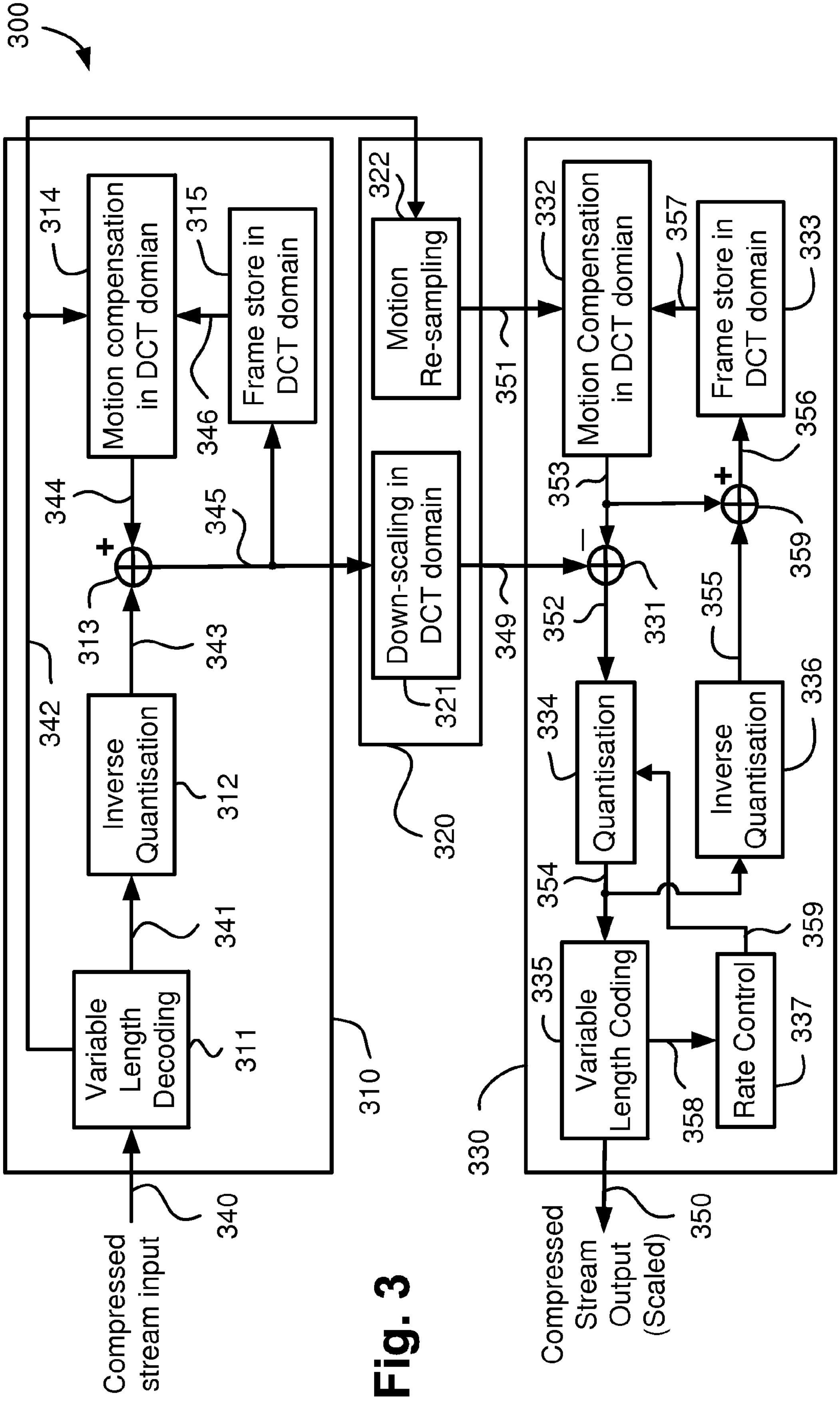
FIG. 3 is a block diagram of a current DCT domain downscaling transcoder.

Now consider decoding the pre-encoded data $w_n$ using a DCT-domain decoder (the part 310 of FIG. 3). Let $w^D$ and $x^D$ denotes the input DCT coefficient (341) parsed by the VLD module (311) and reconstructed DCT data (345), respectively. Provided that VLC and VLD pair are informational losses operations, the decoding process of the DCT coefficient $w^D$ is given by the following:

$$w_n^S = w_n,$$

$$x_n^D = IQ(w_n^D) + MC^D(x_{n-1}^D) \qquad (10)$$

Comparing (10) with (9), it is obvious that the essential condition for a perfect video reconstruction using the DCT domain decoder is given by the following:

$$x_n^S = IDCT(x_n^D) \qquad (11)$$

which leads to the following condition:

$$IDCT(IQ(w_n^D)) + IDCT(MC^D(x_{n-1}^D)) = IDCT(IQ(w_n^S)) + RND(MC(x_{n-1}^S)) \qquad (12)$$

based the linearity of the IDCT transform. After further eliminating the common part on both sides of the mathematical expression, and taking advantage the linearity of MC operation, the condition (12) can be expressed as follows:

$$IDCT(MC^D(x_{n-1}^D)) = MC(IDCT(x_{n-1}^D)) = MC(x_{n-1}^S) = RND(MC(x_{n-1}^S)) \qquad (13)$$

As there is a rounding operation RND(•) on the right hand side of (13), perfect reconstruction for (10) can not be guaranteed. As a result, a mismatch exists for the DCT-domain decoder (10) whenever the rounding operation RND(•) is performed for the half-pel motion process. Such rounding mismatch also accumulates along the temporal scale because of the temporal motion prediction among frames, which, in turn, often results in a noticeable color drift distortion in high motion areas of motion predicted pictures (i.e., P/B pictures).

There have been some attempts to try balancing the operation speed and the video quality of DCT domain transcoders. In one example, a reduced-scale MC-DCT operation is applied only to B pictures to achieve an increase in speed, while a full-scale MC-DCT operation is retained for P picture to avoid error propagation along temporal scale. In other approaches, a binary approximated MC-DCT is used for integer motion compensation while a high-accuracy matrix factorization MC-DCT is used for fractional motion compensation. However, all of these approaches can lead to visible color drift in high motion areas of P/B pictures.

The Best Mode Description

Where reference is made in any one or more of the accompanying drawings to steps and/or features, which have the same reference numerals, those steps and/or features have for the purposes of this description the same function(s) or operation(s), unless the contrary intention appears.

It is to be noted that discussions in the specification relating to prior art arrangements should not be interpreted as a representation by the present inventors or patent applicant that such arrangements in any way form part of the common general knowledge in the art.

Illustrative SP arrangements are disclosed herein. However, specific structural and functional details presented herein are merely representative and serve to depict examples of the SP approach. The SP approach may be embodied in alternative forms and is not limited to the arrangements set forth herein.

Figure 5:
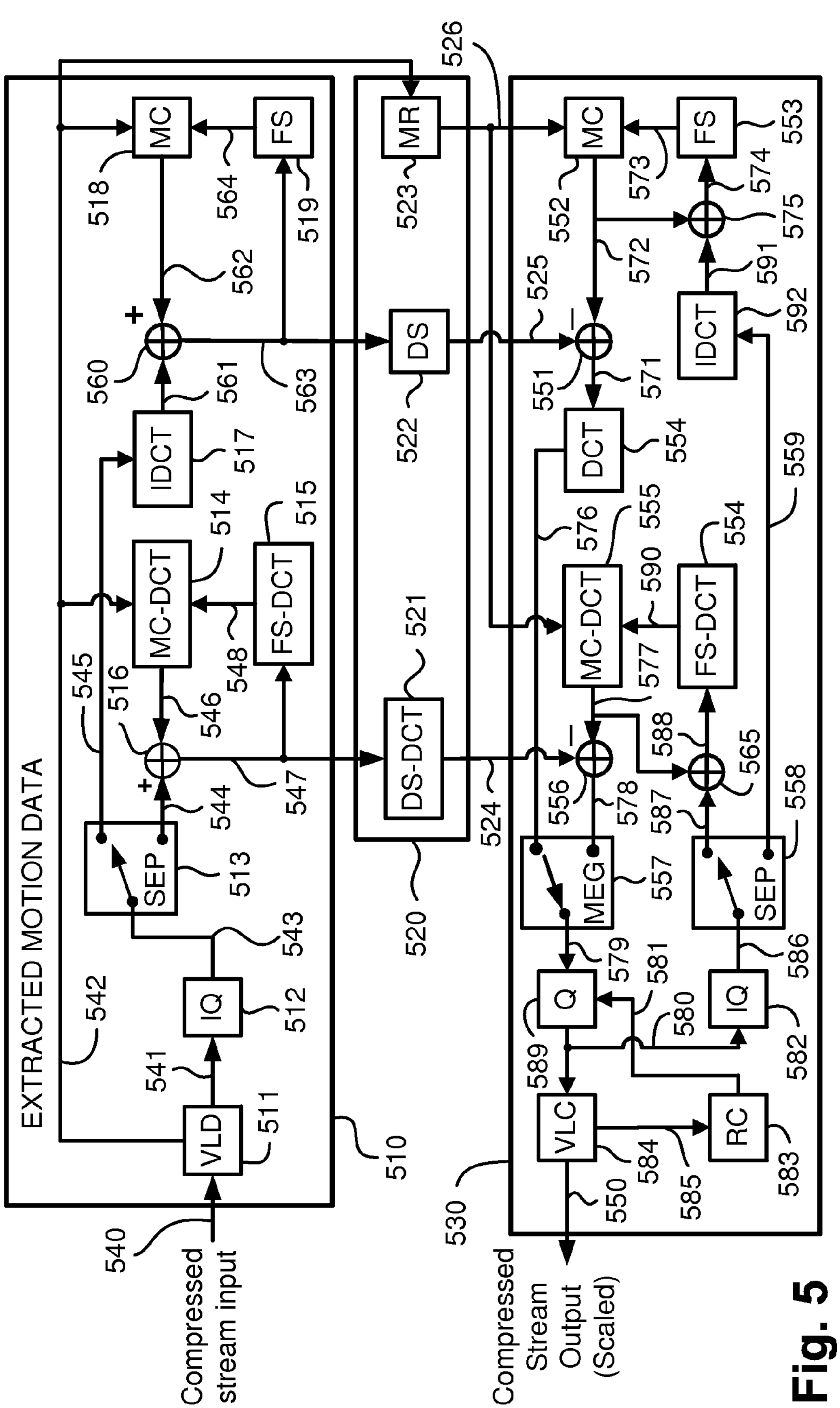
FIG. 5 is a block diagram which shows one arrangement of the downscaling transcoder according to the SP approach.

FIG. 5 is a block diagram which depicts one implementation of the downscaling transcoder according to the SP approach. It aims to address the rounding drift problem in the chroma components and also to enable further speedup of the downscaling transcoder. This is done by processing the high-volume luma data and low-volume chroma data in the DCT domain and in the spatial domain respectively.

The transcoder 500 comprise three main parts performing (ie applying) hybrid operations in the spatial and DCT domains. The transcoder thus comprises a hybrid decoder part 510, a hybrid downscaling part 520, and a hybrid encoder part 530.

Referring to FIG. 5, the module 510 takes a compressed input video stream 540 (this being equivalent to the video stream 240 or 340 in FIGS. 2 and 3 respectively) as input. Within 510 the input compressed stream 540 is entropy-decoded by a VLD module 511 to produce quantized DCT coefficients 541. The quantized DCT coefficients 541 are inversed quantized by an IQ module 512 which outputs decoded DCT data 543. This data 543 is typically packed in a macroblock (MB) structure comprising a set of luma DCT coefficient blocks and a set of chroma DCT coefficient blocks.

A separator (SEP) module 513 separates the luma and chroma components from the decoded DCT data 543. The separation operation is conducted on the MB level in a block-wise manner, For MPEG-2 videos, the four 8×8-size luma DCT coefficient blocks which belong to a same MB unit are separated as a whole and named as "luma DCT data" 544, while the two 8×8-size chroma DCT coefficient blocks of the same MB are separated as "chroma DCT data" 545. The separator module 513 does not necessarily need to be functionally located subsequent to the IQ module 512. The separator module 513 can alternately be functionally located between the VLD module 511 and the IQ module 512. Alternately, the SEP module 513 can be functionally located prior to the entropy-decoding process (i.e., the VLD module 511).

When the decoded DCT data 543 belongs to an inter-coded MB, (also referred to as an inter-encoded MB) extracted motion data 542 (which is associated with the current decoded MB) is output from the VLD module 511, and this data 542 is used for a DCT-domain reconstruction operation to process the separated luma DCT data 544 (also referred as "luma DCT motion residues" or "transform domain luma motion residues") in the DCT domain. The extracted motion data 542 includes "motion prediction mode" (which may for example be forward prediction, backward prediction, and bidirectional prediction) and associated motion vector values. The details of the DCT-domain reconstruction operation which is applied are as follows. Based upon the extracted motion data 542, an MC-DCT module 514 is used to generate compensated luma DCT coefficients 546 (also referred to as compensated transform domain luma data) based upon reference luma DCT coefficients 548 which correspond to previously decoded pictures and which are stored in a luma FS-DCT 515. Then, in a summing module 516 the compensated luma DCT coefficients 546 are summed with the luma DCT motion residues 544 in the DCT-domain. The output 547 of the summing module 516 is the reconstructed luma DCT coefficient (also referred to as "reconstructed transform domain luma data"), which is output into the downscaling part 520. At the same time, the output 547 is stored back to FS-DCT module 515 for use in MC-DCT operation of subsequent coding units.

The separated chroma DCT data 545, which belongs to the inter-coded MB, is first IDCT transformed in a module 517 which outputs chroma data 561 in the spatial-domain (also being referred as "chroma motion residues" or "spatial domain chroma motion residues") and this is how, in the example, the spatial domain chroma data is obtained. Then, the chroma motion residues 561 are subjected to a spatial domain reconstruction operation. The details of the spatial-domain reconstruction operation are as follows. Based upon the extracted motion data 542 produced by the VLD module 511, a spatial-domain MC module 518 is used to generate compensated chroma pixel data 562 (also referred to as spatial domain compensated chroma data) based upon reference chroma pixel data 564 which corresponds to previously decoded pictures, and which are stored in a spatial-domain FS unit 519. Then, in a summing unit 560 the compensated chroma pixel data 562 is summed with the chroma motion residues 561 in the spatial domain. The output 563 of the module 560 is the reconstructed chroma pixel data (also referred to as "reconstructed spatial domain chroma data"), which is output into the downscaling part 520, and at the same time stored back to the chroma FS unit 519 for use in spatial-domain MC operation on subsequent coding units.

In a case where the decoded DCT data 543 belong to an intra-coded MB (also referred to as an intra-encoded MB), there will be no motion data 542 extracted from the VLD 511. Accordingly, the DCT-domain reconstruction operation that is applied for reconstructing separated luma DCT data 544 is equivalent to an identity operation in the DCT domain, i.e., the reconstructed luma DCT coefficients 547 are directly copied from the separated luma DCT data 544 and output into the downscaling part 520. The spatial-domain reconstruction operation used for reconstructing the separated chroma data 544 is also equivalent to an identity operation in the spatial domain. Accordingly, the reconstructed chroma pixel data 563 is directly copied from the separated chroma pixel data 561 and output into the downscaling part 520.

The output of the hybrid decoding part 510, which include the extracted motion data 542, the reconstructed luma DCT coefficients 547, and the reconstructed chroma pixel data 563, is input into the downscaling part 520 to be converted from a first resolution (which is the resolution associated with the input compressed stream 540) to a second resolution (which is the resolution associated with the output compressed stream 550).

The downscaling part 520 conducts scaling operation individually to each of the three inputs (which includes the extracted motion data 542, the reconstructed luma DCT coefficients 547, and the reconstructed chroma pixel data 563) according to the order of coding units which will be encoded in the encoding part 530 (or the scaled coding unit order).

Within the downscaling part 520, the extracted motion data 542 is scaled in an MR module 523 (which is equivalent to the module 222 in FIG. 2) according to the conversion ratio from the first resolution to the second resolution. The MR module may be implemented in the form of a multi-input-to-one-output filter, which takes the motion vectors from a supporting area (the area from which a scaled coding unit (or MB) is scaled from) and treats the horizontal and the vertical components of the input motion vectors individually to produce an output motion vector corresponding to the scaled coding unit. The output 526 of the module 523 is re-sampled motion data (which includes the scaled motion vector, but may not be limited thereto) which is input to the encoding part 530.

Within the downscaling part 520, the reconstructed luma DCT coefficients 547 are processed by a DS-DCT unit 521 which performs resolution conversion of the luma DCT coefficients 547 in the DCT domain. The downscaling operation can be implemented by means of block-based frequency truncation according to the required resolution conversion ratio. For example, for a given 4:1 resolution conversion ratio, the top-left 4×4 sub-blocks of each of four input 8×8 DCT blocks which belong to an input coding unit (or MB) in the supporting area are used form a 8×8 DCT block for the scaled coding unit. The output 524 of the module 521 are scaled luma DCT coefficients which are organized according to the scaled coding unit in 8×8 block-wise form. This is input into the encoding part 530 for scaled compression stream generation.

Within the downscaling part 520, the reconstructed chroma pixel data 563 is processed by a DS module 522 which performs resolution conversion of the chroma pixel data in the spatial domain. The scaling operation can be implemented by means of pixel-wise spatial downsample filtering according to the resolution conversion ratio. For example, for a given 4:1 resolution conversion ratio, every four chroma pixel which are associated with a chroma pixel in the scaled coding unit are processed by a Bilinear or BiCubic downsampling filter to generate the scaled chroma pixel. The output 525 of the module 522 is the scaled chroma pixel data which has been downsampled into the second resolution.

The outputs of the downscaling part 520, which includes the resampled motion data 526, the scaled luma DCT coefficients 524, and the scaled chroma pixel data 525, are input into the encoding part 530 which generates the compressed video stream 550 in the scaled resolution based on the processed luma and chroma data in different domains.

Within the encoding part 530, the scaled luma DCT coefficients 524 from the downscaling part 520 are encoded in the DCT domain. The details of the DCT-domain encoding operations are presented as follows. When the current scaled coding unit is to be encoded as a inter-coded Mb, the scaled motion data 526 from the downscaling part 520 is used to control an MC-DCT unit 555 to produce compensated luma DCT coefficients 577 from reference luma DCT coefficients 590 which correspond to previously encoded pictures (or coding units) and which are stored in a luma FS-DCT 554. Then the output 577 of the module 555 (the compensated luma DCT coefficients) are processed with the scaled luma DCT coefficients 524 in the DCT domain in a difference module 556. The output 578 of the module 556 is the luma DCT motion residue (also referred to as the scaled transform domain luma motion residues) which is passed to a merger module (MEG) 557 later. In the case where the current scaled coding unit is to be intra-coded, the scaled luma DCT coefficient 524 is directly copied over in the DCT domain (this being equivalent to an identity operation in the DCT domain) to produce 578, one of the inputs of the MEG module 557.

Within the encoding part 530, the scaled chroma pixel data 525 from the downscaling part 520 is encoded in the spatial domain. The details of the spatial-domain encoding operations are presented as follows. When the current scaled coding unit is to be encoded as a inter-coded Mb, the scaled motion data 526 from the downscaling part 520 is used to control a spatial-domain MC module 552 to produce compensated chroma pixel data 572 from reference chroma pixel data 573 which corresponds to previously encoded pictures and which is stored in a chroma pixel FS unit 553. Then, in a difference module 551 the scaled chroma pixel data 525 is processed with the compensated chroma pixel data 572 in the spatial domain. The output 571 from the module 551 is the chroma pixel-wise motion residue (also referred to as the scaled spatial domain chroma motion residues) which is associated with the re-sampled motion data 526. The data 571 is further transformed into the DCT domain by a DCT unit 554 which outputs chroma DCT motion residue 576 (also referred to as the scaled spatial domain chroma motion residues) which is passed to the MEG module 557. In the case where the current scaled coding unit is to be intra-coded, the scaled chroma pixel data 525 is directly copied over to 571 in the spatial domain (which is equivalent to an identity operation in the spatial domain) and 571 is fed into the DCT unit 554 which outputs 576 which is fed to the MEG module 557.

As previously described, the merger module 557 is incorporated in the part 530, the merger module 557 performing merging of 578 and 576 in the DCT domain. The merging operation is typically conducted for each scaled coding unit in a block-wise manner. Accordingly, given a coding unit for an MPEG-2 video stream, the four 8×8 blocks of luma DCT coefficients (578) and the two 8×8 blocks of chroma DCT coefficients (576), are packed together to become a block-wise DCT coefficient 579. Such DCT coefficients are then quantized in the module 589 whose output 580 is then entropy-encoded by a VLC unit 584 whose output is the scaled compressed stream 550. The module 584 also generates bit-budget statistics data 585 for a rate control (RC) module 583, which is used to update the quantization step, output as 581, for use by the module 589 in quantizing subsequent coding units.

During the encoding process, the encoder part 530 also reconstructs the encoded picture data. The reconstruction operation used by the encoding part 530 is very similar to the operation performed by the decoding part 510. The quantized DCT coefficient 580 from the quantization (Q) module 589 is inverse-quantized in an IQ module 582. Then, a separator module 558 (which is equivalent to the module 513) separates luma DCT coefficients 587 and chroma DCT coefficients 559 from the output 586 of the IP module 582. The separated luma DCT coefficients 587 are summed with the compensated luma DCT coefficients 577 generated by the MC-DCT module 555 in a summing unit 565, whose output 588 (being the reconstructed scaled luma DCT coefficients) is stored in the luma DS-DCT module 554 to be used in the encoding process of further scaled luma DCT coefficients. On other hand, the chroma DCT coefficients 559 separated by the SEP module 558 are IDCT transformed in a module 592 whose output 591 is then combined, with the compensated chroma pixel data 572 generated from the spatial-domain MC module 552 in a summer unit 575. The output 574 of the module 575 is the reconstructed scaled chroma pixel data which is stored into the chroma pixel FS unit 553 to be used in the encoding process of further scaled chroma pixels.

Figure 7:
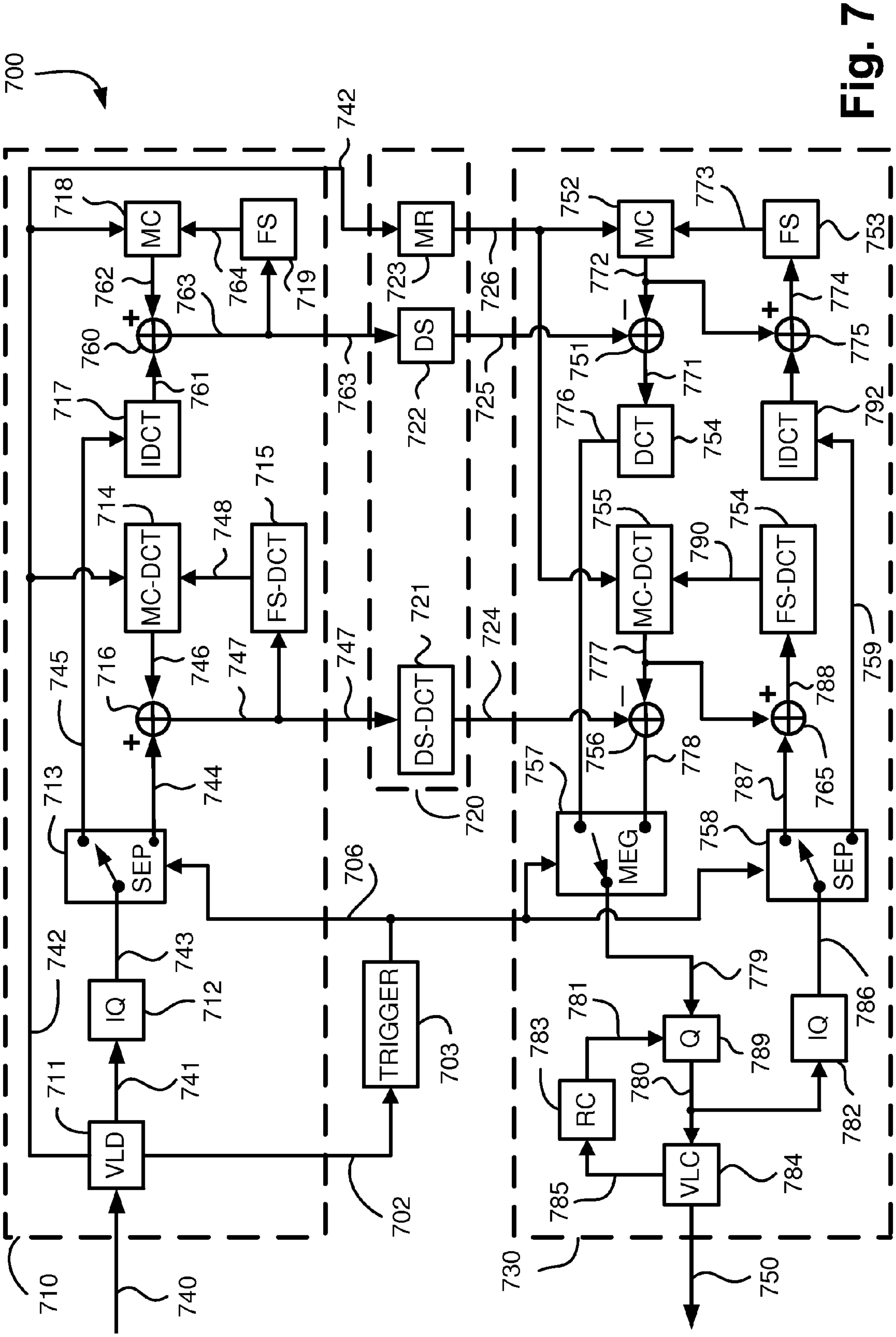
FIG. 7 is a block diagram which shows another arrangement of the downscaling transcoder according to the SP approach.

FIG. 7 is a block diagram that depicts another implementation 700 of the downscaling transcoder according to the SP approach. The SP approach in the transcoder 700 can be triggered when a certain trigger condition is met. The transcoder 700 comprises a decoder module 710, a downscaling module 720, an encoder module 730, and a trigger module 703 for determining if the trigger condition has been met.

Referring to FIG. 7, the decoder module 710 takes a compressed input video stream 740 as its input. The compressed video stream 740 is input to a VLD module 711 where entropy decoding operations are performed. The VLD module 711 produces three outputs, namely motion vectors 742, quantized DCT coefficients 741, and encoding information 702.

The quantized DCT coefficients 741 are inversed quantized in an IQ module 712 to form so-called decoded DCT coefficients 743. Typically, the decoded DCT coefficients 743 are packed in macroblocks (MB), each comprising a set of luma DCT coefficient blocks and chroma DCT coefficient blocks.

The encoding information 702 is input into the trigger module 703 to control the operation of the transcoder 700. In a first arrangement, the encoding information 702 that is output from the VLD module 711 is the size of the GOP (Group of Pictures) extracted from the input video stream 740 (ie the number of pictures in the GOP). Since chroma drift distortion usually occurs when a large number of inter-predicted frames are processed by the transform domain operations, such as MC-DCT and DS-DCT, the GOP size is a simple indicator of the likelihood of drift distortion occurring if the transform domain operations are applied to the chroma component of the input video stream 740.

The trigger module 703 in the first implementation determines a trigger condition by comparing the GOP size to a preset threshold to determine a control signal 706. If the extracted GOP size is less than the preset threshold, then the transform domain operations used in the decoder module 710 typically produce unnoticeable drift distortions in the chroma component. Therefore, the control signal 706 output from the trigger module 703 for this situation is set to OFF. This means that the SP approach is deactivated, and consequently, both the luma and the chroma components of the input video stream 740 are processed in the transform domain.

On the other hand, if the GOP size is greater than (ie exceeds) the preset threshold, then the transform domain operations used in the decoder module 710 typically result in noticeable distortions in the chroma component. Therefore, the control signal 706 output from the trigger module 703 in this situation is set to ON. This means that the SP approach is activated, and consequently, the chroma component of the input video stream 740 is processed in the spatial domain, while the luma component of the input video stream 740 is processed in the transform domain.

Preferably, the threshold value used in the trigger module 703 is determined offline using a training video stream. The threshold value is set to a value which results in a "just-noticeable-distortion" (JND) in the chroma component of the reconstructed training video.

In a second implementation, the encoding information 702 that is output from the VLD module 711 includes information on the macroblock encoding mode (i.e., intra-coded or inter-coded) and the motion vectors extracted from the input video stream 740.

Each MC-DCT operation typically results in some rounding errors. If an inter-coded block in a current frame refers to an inter-coded block in the reference frame, then the rounding error from the inter-coded block in the reference frame will accumulate with the rounding error resulting from the MC- DCT operation of the inter-coded block in the current frame. Such an accumulation of rounding error occurs along multiple inter-blocks, and eventually results in a noticeable chroma drift in the reconstructed video. Therefore, the number of times a macroblock position has the MC-DCT operation applied to it is an efficient indicator of the likelihood of the chroma drift distortion occurring. Compared to the first implementation, the second implementation can refine the control signal 706 from the GOP level down to the macroblock level, with an increased computation cost.

Preferably, the trigger module 703 in the second implementation tracks motion intensity of each inter-coded macroblock by counting the number of MC-DCT operations applied to the data of each inter-coded macroblock. If a majority of the data belonging to the current inter-coded macroblock is predicted from an inter-coded macroblock in the reference frame based on the motion vector, then the current inter-coded macroblock is assigned an MC-DCT counting number (ie index) which equals the MC-DCT counting number of the referenced inter-coded macroblock plus one. Otherwise, if majority of the data belonging to the current inter-coded macroblock is predicted from an intra-coded macroblock in the reference frame, the counting number assigned to current inter-coded macroblock is reset to "one".

Alternatively, the trigger module 703 in the second implementation tracks motion intensity of each inter-coded macroblock by counting the number of inter-coded modes for each macroblock. If the current macroblock is inter-coded and its co-located macroblock in the reference frame is also inter-coded, then the current inter-coded macroblock is assigned an inter-coded counting number (ie index) which equals the inter-coded counting number of the co-located inter-coded macroblock plus one. Otherwise, if the current macroblock is inter-coded and its co-located macroblock in the reference frame is intra-coded, the counting number assigned to current inter-coded macroblock resets to "one".

After updating the counting number for each inter-coded macroblock in the current frame, a preset threshold is used in the trigger module 703 to evaluate each of these counter numbers (ie indices) on a macroblock-by-macroblock basis. If the counter number of an inter-coded macroblock is below the preset threshold, then the transform domain operations involved in the decoder module 710 typically result in unnoticeable drift distortion in the chroma component. Therefore, the control signal 706 output from the trigger module 703 in this case is set to OFF. This means that the SP approach is deactivated for this inter-coded macroblock. Consequently, both the luma and the chroma components of the input video stream 740 are processed in the transform domain.

On the other hand, if the counter number of an inter-coded macroblock is greater than (ie exceeds) the preset threshold, then those transform domain operations used in the decoder module 710 typically result in noticeable distortions in the chroma component. Therefore, the control signal 706 output from the trigger module 703 in this case is set to ON. This means that the SP approach is activated for this inter-coded macroblock. Consequently, the chroma component of the current inter-coded macroblock is processed in the spatial domain, while the luma component of the current inter-coded macroblock is processed in the transform domain.

Preferably, the threshold value used in the second implementation of the trigger module 703 is determined offline using a training video stream. The threshold value is set to the value which results in "just-noticeable-distortion" (JND) in the chroma component of an inter-coded macroblock in the reconstructed training video.

Having described the functionality of the trigger module 703, the functionalities of the encoder module 710, the scaling module 720, and the encoding module 730 are now described in detail, these being dependent upon the activation of the SP approach by the trigger module 703 as described.

In the first instance, the decoding, scaling, and encoding operations in the decoder module 710, the scaling module 720, and the encoder module 730, respectively are described when the control signal 706 is set to OFF.

When the control signal 706 is set to OFF, the SP approach is deactivated. The SEP module 713 in the decoder module 710 produces an output 744 comprising all the DCT coefficients 743 (including both luma and chroma component) output from the IQ module 712. Consequently, the decoding operations for the DCT coefficients 744 from the SEP module 713 are performed in the DCT domain.

The DCT domain decoding operations start with an MC-DCT module 714. The MC-DCT module 714 take two inputs, namely the motion data 742 extracted by the VLD module 711, and the reference DCT coefficients 748 from a FS-DCT module 715. The MC-DCT module 714 uses the motion vector 742 to perform DCT-domain motion compensation known in the art based on the reference DCT coefficients 748. The output of the MC-DCT module 755 is the motion-compensated DCT coefficients 746. Then, in an adder module 716, the motion-compensated DCT coefficients 746 are summed with the output 744 from the SEP module 713 in the DCT-domain to produce reconstructed DCT coefficients 747. Finally, the FS-DCT module 715 stores the reconstructed DCT coefficients 747 in the DCT domain to facilitate subsequent MC-DCT operations.

In a case where the decoded DCT coefficients 743 belong to an intra-coded macroblock, there is no motion data 742 extracted from the VLD module 711. Accordingly, the DCT-domain reconstruction operations are equivalent to an identity operation in the DCT domain, that is, the reconstructed DCT coefficients 747 are directly copied from the DCT coefficient 744, bypassing the summing module 716 and the MC-DCT module 714. However, the reconstructed DCT coefficients 747 are still stored in the FS-DCT module to facilitate subsequent MC-DCT operations. This completes the descriptions of the decoder module 710 when the control signal 706 is set to OFF.

Now we describe the scaling operations in the scaling module 720 when the control signal 706 is set to OFF. When the control signal 706 is set to OFF, there are two operating functional modules in the scaling module 720, namely a DS-DCT module 721, and an MR module 723.

The DS-DCT module 721 takes the reconstructed DCT coefficients 747 from the decoder module 710 as its input. The module 721 performs resolution conversion of the reconstructed DCT coefficients 747 in the DCT domain. The DS-DCT module 721 can be implemented using any suitable DCT domain scaling algorithm known in the art the art, e.g., block-based frequency truncation or box filtering algorithm. The output of the DS-DCT module 721 is a scaled version of the reconstructed DCT coefficients 747, denoted as 727.

The MR module 723 takes the motion data 742 from the decoder module 710 as its input. The module 723 applies the re-sampling operation to the motion vectors to generate motion vectors for the scaled DCT coefficients 724. The MR module 723 can be implemented using any suitable motion vector re-sampling algorithm domain known in the art, i.e., a weighted average filter, or a weighted median filter. The output the MR module 523 is the re-sampled motion vector 726. This completes the descriptions of the scaling module 720 when the control signal 706 is set to OFF.

Now we describe the encoding operations in the encoder module 730 when the control signal 706 is set to OFF.

When the control signal 706 is set to OFF, all the scaled DCT coefficient 724 are encoded in the DCT domain with the help of three DCT-domain function modules, namely an MC-DCT module 755, an FS-DCT module 754, and an adder module 756. When the current scaled macroblock is to be encoded in inter-coded mode, the MC-DCT module 755 uses the re-sampled motion vector 726 from the scaling module 720 to perform DCT-domain motion compensation based on the reference DCT coefficients 790 from the FS-DCT module 754. The output of the MC-DCT module 755 is the motion-compensated DCT coefficients 777. Then, in an adder module 756, the motion-compensated DCT coefficients 777 are subtracted from the scaled DCT coefficients 724 that are output from the scaling module 720. What is left over is the "motion residue" in the DCT domain, denoted as 778.

When the control signal 706 from the trigger module 703 is set to be OFF, the MEG module 757 directly passes the DCT-domain motion residue 756 as its output 779. The output 779 is then quantized in a Q module 789 according to a rate control signal 781 generated by an RC module 783. The output of the Q module is a quantized version of the motion residue 779, denoted as 780. The quantized motion residue 780 is further entropy-encoded in a VLC module 784, which produced a scaled version of the original input video stream 740, denoted as 750. The VLC module also produces rate statistics information 785. The rate statistics information 785 is utilized by the RC module 783 to facilitate the rate control of the scaled video stream 750.

During the encoding process, the encoder module 730 also reconstructs the encoded video data. When the control signal 706 from the trigger module 703 is set to be OFF, such a reconstruction is performed with the help of four functional modules, namely an IQ module 782, a SEP module 758, an adder module 765, and the FS-DCT module 754. Firstly, the quantized motion residue 780 from the Q module 789 is inverse-quantized in an IQ module 782. Then the SEP module 758 (which is functionally identical to the module 713) passes the inverse-quantized motion residue 786 as its output 787. Furthermore, the output 787 from the SEP module 758 and the output 777 from the MC-DCT module 755 are added together in the adder module 765. The output of the adder module 765 is the reference DCT coefficients 788, which are stored by the DS-DCT module 754 to facilitate further encoding process in the encoder module 730. This completes the description of the entire transcoding processing when the control signal 706 from the trigger is set to be OFF.

Now the functionality of the transcoder module 700 when the control signal 706 is set to be ON is described in detail.

When the control signal 706 from the trigger module 703 is set to ON, the SP approach is activated for each inter-coded macroblock. Consequently, the luma components of the input video stream 740 are processed in the transform domain using a set of DCT-domain operations, while the luma components of the input video stream 740 are processed in the spatial domain using a set of spatial domain operations. The separation and the merging of the luma and chroma components are implemented by three individual functional modules, namely the SEP module 713 in the decoder module 710, the MEG module 757 in the encoder module 730, and the SEP module 758 in the encoder module 730.

When the control signal 706 input into the SEP module 713 is set to be ON, the SEP module 713 performs the separation of the luma and chroma components from the inverse-quantized DCT coefficient 743. Preferably, the separation operation is conducted at the macroblock level in a block-by-block manner. Luma DCT coefficient blocks are output from the SEP module as the output 744, while chroma DCT coefficient blocks are output from the SEP module 713 as another output 745. These two outputs from the SEP module are processed in the transform and the spatial domain, respectively.

Now we describe the transform-domain operations which are applied to the luma DCT coefficient blocks 744 in the decoder module 710 when the SP approached is activated.

The DCT domain decoding operations start with a MC-DCT module 714. The MC-DCT module 714 take two inputs, namely the motion data 742 extracted by the VLD module 711, and reference luma DCT coefficients 748 from an FS-DCT module 715. The MC-DCT module 714 uses the motion vector 742 to perform DCT-domain motion compensation known in the art based on the reference luma DCT coefficients 748. The output of the MC-DCT module 755 is the motion-compensated luma DCT coefficients 746. Such motion-compensated luma DCT coefficients 746 are summed in an adder module 716 with the output 744 from the SEP module 713, generating the so-called reconstructed luma DCT coefficients 747. The reconstructed luma DCT coefficients 747 are stored by the FS-DCT module 715 to facilitate subsequent MC-DCT operations on the luma DCT coefficients.

Now we describe the spatial-domain operations which are applied to the chroma DCT coefficient blocks 745 in the decoder module 710 when the SP approached is activated.

The chroma DCT coefficient blocks 745 output from the SEP module 713 are first fed into an IDCT module 717. The IDCT module 717 applies the operation of inverse-DCT transformation to the blocks 745 to generate chroma residue data 761 in the spatial-domain. The chroma residue data 761 from the IDCT module 717 are then subjected to application of a set of spatial-domain reconstruction operations.

The spatial domain reconstruction operations start with an MC module 718. The MC module 718 take two inputs, namely the motion data 742 extracted by the VLD module 711, and a reference chroma pixel data 564 from an FS module 719. The MC module 718 uses the motion vector 742 to perform spatial-domain motion compensation known in the art based on the reference chroma pixel data 564. The output of the MC module 718 is motion-compensated chroma pixel data 762. The motion-compensated chroma pixel data 762 are summed in another adder module 703 with the output 761 from the IDCT module 717, generating so-called reconstructed chroma data 763. The reconstructed chroma data 763 are stored by the FS module 719 to facilitate subsequent spatial-domain MC operations on the chroma pixel data.

Now we describe the scaling operations in the scaling module 720, which are applied to the output of the encoder module 710 when the SP approach is activated. Three functional modules operational in the scaling module 720 when the SP approach is activated, which include a DS-DCT module 721, a DS module 722, and a MR module 723.

The DS-DCT module 721 processes the reconstructed luma DCT coefficients 747 from the decoder module 710. The module 721 performs resolution conversion of the luma DCT coefficients 747 in the DCT domain. The DS-DCT module 721 can be implemented using any suitable DCT domain scaling algorithm known in the art the art, e.g., block-based frequency truncation or box filtering algorithm. The output of the DS-DCT module 721 is a scaled version of the luma DCT coefficients 747, denoted as 727.

The DS module 722 processes the reconstructed chroma pixel data 763 from the decoder module 710. The module 722 performs resolution conversion of the chroma pixel data 763 in the spatial domain. The DS module 722 can be implemented using any suitable spatial domain scaling algorithm known in the art the art, e.g., pixel-wise Bilinear or BiCubic scaling filters. The output of the DS module 722 is a scaled version of the chroma pixel data 763, denoted as 725.

The MR module 723 processes the motion data 742 from the decoder module 710. The module 723 applies the re-sampling operation to the motion vectors to generate motion vectors for the scaled DCT coefficients 724. The MR module 723 can be implemented using any suitable motion vector re-sampling algorithm domain known in the art, e.g., a weighted average filter, or a weighted median filter. The output the MR module 523 is the re-sampled motion vector 726.

Now we describe the encoding operations in the encoder module 730 when the SP approach is activated.

When the SP approach is activated, the outputs of the scaling module 720, which include the scaled luma DCT coefficients 724, the scaled chroma pixel data 725, and the re-sampled motion vector 726, are processed in the encoder module 730 using a set of DCT-domain operations and spatial-domain operations.

The scaled luma DCT coefficient 724 are encoded in the DCT domain with the help of three DCT-domain function modules, namely an MC-DCT module 755, a FS-DCT module 754, and an adder module 756. The MC-DCT module 755 uses the re-sampled motion vector 726 to perform DCT-domain motion compensation known in the art based on the reference luma DCT coefficients 790 from the FS-DCT module 754. The output of the MC-DCT module 755 is the motion-compensated luma DCT coefficients 777. The motion-compensated luma DCT coefficients 777 are subtracted from the scaled DCT coefficients 724 in the adder module 756. What is left over is the luma “motion residue” in the DCT domain, denoted as 778.

The scaled chroma pixel data 725 are encoded in the spatial domain with the help of four spatial-domain function modules, namely an MC module 752 an FS module 753, an adder module 751, and a DCT module 754. The MC module 752 uses the re-sampled motion vector 726 to perform spatial-domain motion compensation known in the art based on the reference chroma pixel data 773 from the FS module 753. The output of the MC module 752 is the motion-compensated chroma pixel data 772. The chroma pixel data 772 are subtracted from the scaled chroma pixel data 725 in the adder module 751. What is left over is the chroma “motion residue” in the spatial domain, denoted as 771. Such a chroma motion residue 771 is then DCT-transformed in the DCT module 754 to become chroma DCT coefficients 776.

When the SP approach is activated, the MEG module 757 performs the merging of 776 and 778 in the DCT domain. The merging operation is typically conducted for each encoding macroblock in a block-wise manner. Given a macroblock in an MPEG-2 video stream, the four 8×8 blocks of luma DCT coefficients (578) and the two 8×8 blocks of chroma DCT coefficients (576), are packed together to become a macroblock-based DCT coefficients 779.

After the merging operation, the macroblock-based DCT coefficients 779 are quantized in a Q module 789 according to a rate control signal 781 generated by an RC module 783. The output of the Q module is a quantized version of the DCT coefficients 779, denoted as 780. The quantized DCT coefficients 780 are further entropy-encoded in a VLC module 784, which produced a scaled version of the original input video stream 740, denoted as 750. The VLC module also produces rate statistics information 785. The rate statistics information 785 are utilized by the RC module 783 to facilitate the rate control of the scaled video stream 750.

During the encoding process, the encoder module 730 also reconstructs the encoded video data. When the SP approach is activated, the reconstruction steps are also performed separately for the luma and chroma components of the encoded video data, with the help of the SEP module 758.

Prior to the luma and chroma separation in the SEP module 758, the quantized DCT coefficients 780 from the Q module 789 are inverse-quantized in an IQ module 782. Then the SEP module 758 performs the separation of luma and chroma components from the inversed-quantized DCT coefficients 786. The separation operation in the SEP 758 is identical to that of the SEP module 713 in the decoder module 710. Consequently, the SEP module 758 produces two outputs, luma DCT coefficients 787, and chroma DCT coefficients 759.

According to the SP approach, the reconstruction of the luma DCT coefficients 787 is performed in the DCT domain. The luma DCT coefficients 787 from the SEP module 758 and the output 777 from the MC-DCT module 755 are added together in an adder module 765, generating so-called reconstructed luma DCT coefficients 788. Such reconstructed luma DCT coefficients 788 are stored by the DS-DCT module 754 to facilitate further encoding process of luma component in the encoder module 730.

On the other hand, the reconstruction of the chroma DCT coefficients 759 is performed in the spatial domain. The chroma DCT coefficients 759 from the SEP module 758 first undergo an inverse-DCT transformation in an IDCT module 792. Then, the output from the IDCT module 792 is added to the output 772 from the MC module 752 in the spatial domain. The output of the adder module is the so-called reconstructed chroma pixel data 774. Such reconstructed chroma pixel data 774 are stored by a DS module 753 to facilitate further encoding process of chroma component in the encoder module 730. This completes the description of the entire transcoding processing when the control signal 706 from the trigger is set to be OFF and the SP approach is activated.

Figure 6:
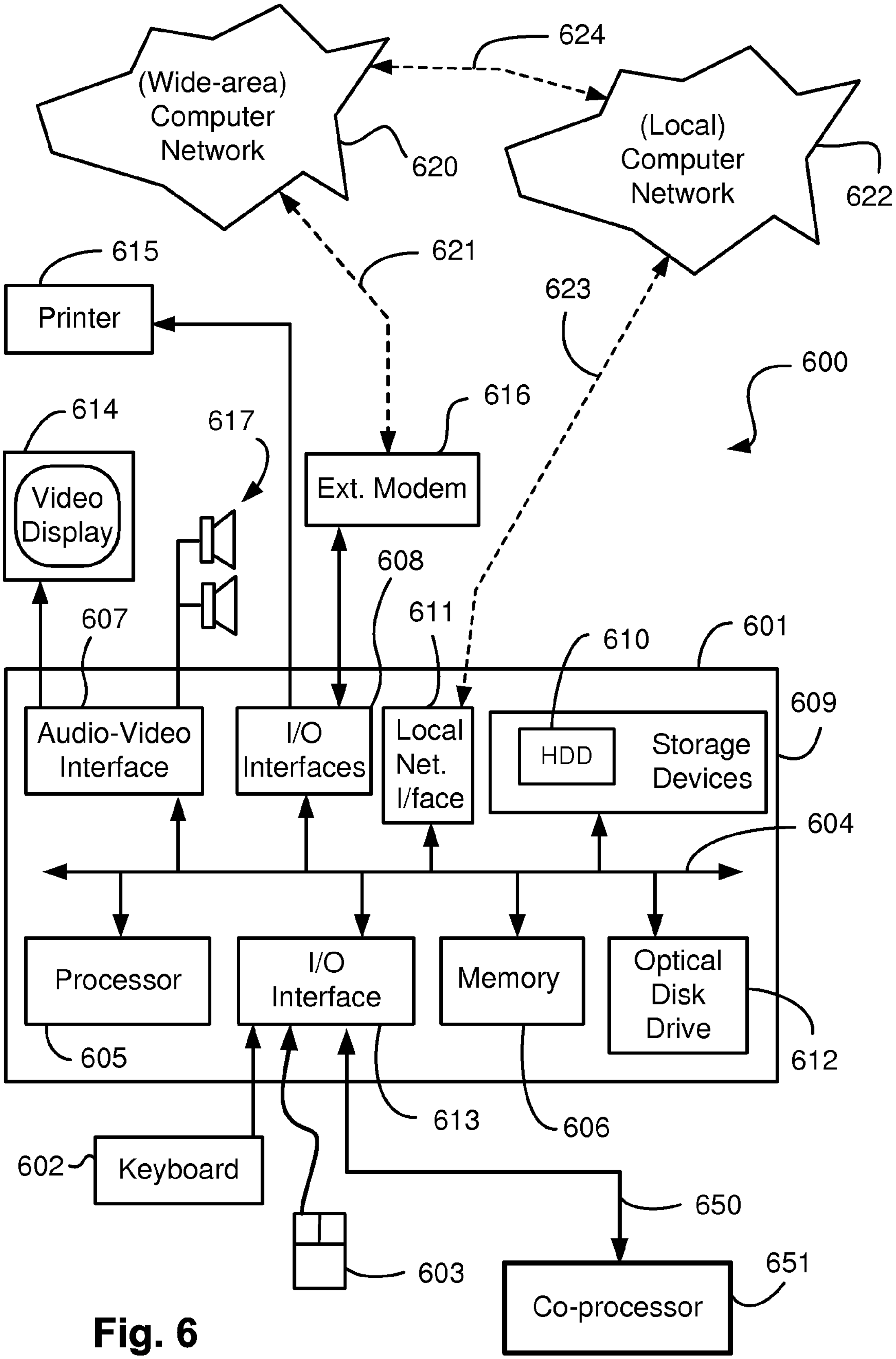
FIG. 6 is a schematic block diagram of a general purpose computer upon which described SP arrangements can be practiced.

FIG. 6 shows how the described SP arrangements may be implemented, in whole or in part, using a general purpose computer system 600.

The SP arrangement of FIG. 5 may thus be implemented as software, using one or more application programs executable within the computer system 600.

Alternately, the SP arrangement can be implemented as a hybrid arrangement, with one or more modules of FIG. 5 implemented in hardware in a coprocessor configuration 651 that is connected to the computer module 601 by a connection 650. In this hybrid arrangement, the hardware modules in the coprocessor 651 performs some of the SP arrangement functions, while the remaining SP arrangement functions are performed by one or more software applications running on the computer module 601.

In relation to the software modules, the SP arrangement method steps are effected by instructions in the software that are carried out within the computer system 600. The instructions may be formed as one or more code modules, each for performing one or more particular tasks. The software may also be divided into two separate parts, in which a first part and the corresponding code modules performs the SP arrangement methods and a second part and the corresponding code modules manage a user interface between the first part and the user.

The software may be stored in a computer readable medium, including the storage devices described below, for example. The software is loaded into the computer system 600 from the computer readable medium, and then executed by the computer system 600. A computer readable medium having such software or computer program recorded on it is a computer program product. The use of the computer program product in the computer system 600 preferably affects an advantageous apparatus for performing the SP arrangements, whether this is implemented purely in software, or in the aforementioned hybrid arrangement.

The SP arrangements may alternatively be implemented in dedicated hardware such as one or more integrated circuits performing the functions or sub functions of the SP arrangements. Such dedicated hardware may include graphic processors, digital signal processors, or one or more microprocessors and associated memories.

As seen in FIG. 6, the computer system 600 is formed by a computer module 601, input devices such as a keyboard 602 and a mouse pointer device 603, and output devices including a printer 615, a display device 614 and loudspeakers 617. An external Modulator-Demodulator (Modem) transceiver device 616 may be used by the computer module 601 for communicating to and from a communications network 620 via a connection 621. The network 620 may be a wide-area network (WAN), such as the Internet or a private WAN. Where the connection 621 is a telephone line, the modem 616 may be a traditional "dial-up" modem. Alternatively, where the connection 621 is a high capacity (eg: cable) connection, the modem 616 may be a broadband modem. A wireless modem may also be used for wireless connection to the network 620.

The computer module 601 typically includes at least one processor unit 605, and a memory unit 606 for example formed from semiconductor random access memory (RAM) and read only memory (ROM). The module 601 also includes an number of input/output (I/O) interfaces including an audio-video interface 607 that couples to the video display 614 and loudspeakers 617, an I/O interface 613 for the keyboard 602 and mouse 603 and optionally a joystick (not illustrated), and an interface 608 for the external modem 616 and printer 615. In some implementations, the modem 616 may be incorporated within the computer module 601, for example within the interface 608. The computer module 601 also has a local network interface 611 which, via a connection 623, permits coupling of the computer system 600 to a local computer network 622, known as a Local Area Network (LAN). As also illustrated, the local network 622 may also couple to the wide network 620 via a connection 624, which would typically include a so-called "firewall" device or similar functionality. The interface 611 may be formed by an Ethernet™ circuit card, a wireless Bluetooth™ or an IEEE 802.21 wireless arrangement.

The interfaces 608 and 613 may afford both serial and parallel connectivity, the former typically being implemented according to the Universal Serial Bus (USB) standards and having corresponding USB connectors (not illustrated). Storage devices 609 are provided and typically include a hard disk drive (HDD) 610. Other devices such as a floppy disk drive and a magnetic tape drive (not illustrated) may also be used. An optical disk drive 612 is typically provided to act as a non-volatile source of data. Portable memory devices, such optical disks (e.g, CD-ROM, DVD), USB-RAM, and floppy disks for example may then be used as appropriate sources of data to the system 600.

The components 605, to 613 of the computer module 601 typically communicate via an interconnected bus 604 and in a manner which results in a conventional mode of operation of the computer system 600 known to those in the relevant art. Examples of computers on which the described arrangements can be practised include IBM-PC's and compatibles, Sun Sparcstations, Apple Mac™ or alike computer systems evolved therefrom.

Typically, the application programs discussed above are resident on the hard disk drive 610 and read and controlled in execution by the processor 605. Intermediate storage of such programs and any data fetched from the networks 620 and 622 may be accomplished using the semiconductor memory 606, possibly in concert with the hard disk drive 610. In some instances, the application programs may be supplied to the user encoded on one or more CD-ROM and read via the corresponding drive 612, or alternatively may be read by the user from the networks 620 or 622. Still further, the software can also be loaded into the computer system 600 from other computer readable media. Computer readable media refers to any storage medium that participates in providing instructions and/or data to the computer system 600 for execution and/or processing. Examples of such media include floppy disks, magnetic tape, CD-ROM, a hard disk drive, a ROM or integrated circuit, a magneto-optical disk, or a computer readable card such as a PCMCIA card and the like, whether or not such devices are internal or external of the computer module 601. Examples of computer readable transmission media that may also participate in the provision of instructions and/or data include radio or infra-red transmission channels as well as a network connection to another computer or networked device, and the Internet or Intranets including e-mail transmissions and information recorded on Websites and the like.

The second part of the application programs and the corresponding code modules mentioned above may be executed to implement one or more graphical user interfaces (GUIs) to be rendered or otherwise represented upon the display 614. Through manipulation of the keyboard 602 and the mouse 603, a user of the computer system 600 and the application may manipulate the interface to provide controlling commands and/or input to the applications associated with the GUI(s).

INDUSTRIAL APPLICABILITY

It is apparent from the above that the arrangements described are applicable to the computer and data processing industries.

The foregoing describes only some embodiments of the present invention, and modifications and/or changes can be made thereto without departing from the scope and spirit of the invention, the embodiments being illustrative and not restrictive.

We claim:

1. A method for generating a second compressed video stream having a second resolution, from a first compressed video stream having a first resolution encoded using an encoding method, said method comprising the steps of:

separating transform domain luma data and spatial domain chroma data for a frame from said first compressed video stream;

applying a transform domain operation to said luma data to form reconstructed transform domain luma data;

applying, if a trigger condition is met, said transform domain operation to said chroma data to form reconstructed transform domain chroma data;

applying, if said trigger condition is not met, a spatial domain operation to said chroma data to form reconstructed spatial domain chroma data; and scaling said reconstructed transform domain luma data and said reconstructed chroma data to generate said second compressed video stream using said encoding method.

2. A method according to claim 1, wherein the luma data is luma DCT motion residue in inter-coded macroblock, and wherein the step of applying a transform domain operation to said luma data comprises the steps of:

extracting motion data from the first compressed video stream;

generating, based upon said motion data, compensated DCT domain luma data from reconstructed DCT domain luma data in previously decoded pictures; and summing the luma DCT motion residue and the compensated DCT domain luma data in the DCT domain.

3. A method according to claim 2 wherein the extracted motion data includes one or more of motion prediction mode and associated motion vector values.

4. A method according to claim 1, wherein the luma data is DCT domain luma coefficients in intra-coded macroblock, and wherein the step of applying a transform domain operation to said luma data comprises the step of applying an identity operation in the DCT domain to the DCT domain luma coefficients.

5. A method according to claim 1, wherein the chroma data is chroma motion residue in inter-coded macroblock, and wherein the step of applying a spatial domain operation to said chroma data comprises the steps of:

extracting motion data from the first compressed video stream;

generating, based upon said motion data, compensated spatial domain chroma data from reconstructed spatial domain chroma data in previously decoded pictures; and summing the chroma motion residue and the compensated spatial domain chroma data in the spatial domain.

6. A method according to claim 1, wherein the chroma data is chroma pixels in intra-coded macroblock, and wherein the step of applying a spatial domain operation to said chroma data comprises the step of applying an identity operation in the spatial domain to the chroma pixels.

7. A method according to claim 1, wherein the step of extracting transform domain luma data and spatial domain chroma data comprises the steps of:

separating, in a block-wise manner at the macroblock level, transform domain luma and chroma data from said first compressed video stream; and inverse transforming the transform domain chroma data.

8. A method according to claim 1, wherein the step of determining if the trigger condition is met comprises either:

determining if the number of pictures in a group of pictures extracted from the first compressed video stream exceeds a first threshold; or determining if a motion intensity of an inter-coded macroblock in the first compressed video stream exceeds a second threshold.

9. A method for generating a second compressed video stream having a second resolution, from a first compressed video stream having a first resolution encoded using an encoding method, said method comprising:

separating luma transform data and chroma transform data for a frame from said first compressed video stream;

applying a first reconstructing operation in a transform domain to said luma transform data to form reconstructed luma transform data;

obtaining chroma data by inverse transforming said chroma transform data;

applying, if a trigger condition is met, said first reconstructing operation to said chroma data to form reconstructed transform domain chroma data;

applying, if said trigger condition is not met, a second reconstructing operation to said chroma data to form reconstructed chroma data; and generating said second compressed video stream by scaling and encoding said reconstructed luma transform data and said reconstructed chroma data using said encoding method.

10. A method, according to claim 9, where said luma transform data are luma DCT motion residues, and the step of applying said reconstructing operation to said luma transform data comprises the steps of:

extracting motion data from said first compressed video stream;

generating, based upon said motion data, compensated luma DCT coefficients from reconstructed luma DCT coefficients in previously decoded pictures; and summing said compensated luma DCT coefficients with said luma DCT motion residues in the DCT domain.

11. A method, according to claim 9, where said luma transform data are intra-encoded luma DCT coefficients, and said reconstructing operation is an identity operation in the DCT domain.

12. A method, according to claim 9, where said chroma data are chroma motion residues, and the step of applying said reconstructing operation to said chroma data comprises the steps of:

extracting motion data from said first compressed video stream;

generating, based upon said motion data, compensated chroma data from reconstructed chroma data in previously decoded pictures; and summing said compensated chroma data with said chroma motion residues in the spatial domain.

13. A method, according to claim 9, where said chroma transform data are intra-encoded chroma data, and said reconstructing operation is an identity operation in the spatial domain.

14. A method of generating a scaled version of compressed video stream from a compressed video stream encoded using an encoding method, said method comprising:

separating the luma and chroma data from said compressed video stream;

processing said luma data in the transform domain using transform domain motion compensation and transform domain scaling operations;

processing, if a trigger condition is met, said chroma data in the transform domain using said transform domain motion compensation and transform domain scaling operations;

processing, if said trigger condition is not met, said chroma data in the spatial domain using spatial motion compensation and spatial scaling operations; and combining said processed luma and chroma data to generate said scaled version of compressed video stream using said encoding method.

15. A method according to claim 9, wherein said separation of luma and chroma data is conducted after said compressed video stream is parsed by an entropy decoder.

16. A method according to claim 9, wherein said separated luma data is processed in the DCT domain by DCT-domain motion compensation, DCT-domain frame store, and DCT-domain scaling operations.

17. A method according to claim 9, wherein said separated chroma data is processed in the spatial domain by spatial-domain motion compensation, spatial-domain frame store, and spatial-domain downscale operations.

18. A method of generating a scaled version of video data from a compressed video stream encoded using an encoding method, said method comprising:

processing luma data in the transform domain using transform domain motion compensation and transform domain scaling operations;

processing, if a trigger condition is met, said chroma data in the transform domain using said transform domain motion compensation and transform domain scaling operations; and processing, if said trigger condition is not met, chroma data in the spatial domain using spatial motion compensation and spatial scaling operations.

19. An apparatus for generating a second compressed video stream having a second resolution, from a first compressed video stream having a first resolution encoded using an encoding method, said apparatus comprising:

means for separating transform domain luma data and spatial domain chroma data for a frame from said first compressed video stream;

means for applying a transform domain operation to said luma data to form reconstructed transform domain luma data;

means for applying, if a trigger condition is met, said transform domain operation to the chroma data to form reconstructed transform domain chroma data;

means for applying, if the trigger condition is not met, a spatial domain operation to said chroma data to form reconstructed spatial domain chroma data; and means for scaling said reconstructed transform domain luma data and said reconstructed spatial domain chroma data to generate said second compressed video stream using said encoding method.

20. An apparatus for generating a second compressed video stream having a second resolution, from a first compressed video stream having a first resolution encoded using an encoding method, said apparatus comprising:

a memory for storing a program;

a processor for executing the program, said program comprising:

code for separating transform domain luma data and spatial domain chroma data for a frame from said first compressed video stream;

code for applying a transform domain operation to said luma data to form reconstructed transform domain luma data;

code for applying, if a trigger condition is met, said transform domain operation to said chroma data to form reconstructed transform domain chroma data;

code for applying, if the trigger condition is not met, a spatial domain operation to said chroma data to form reconstructed spatial domain chroma data; and code for scaling said reconstructed transform domain luma data and said reconstructed spatial domain chroma data to generate said second compressed video stream using the encoding method.

21. A computer program product including a non-transient computer readable storage medium having recorded thereof a computer program for directing a processor to execute a method for generating a second compressed video stream having a second resolution, from a first compressed video stream having a first resolution encoded using an encoding method, said program comprising:

code for separating transform domain luma data and spatial domain chroma data for a frame from said first compressed video stream;

code for applying a transform domain operation to said luma data to form reconstructed transform domain luma data;

code for applying, if a trigger condition is met, said transform domain operation to said chroma data to form reconstructed transform domain chroma data;

code for applying, if the trigger condition is not met, a spatial domain operation to said chroma data to form reconstructed spatial domain chroma data; and code for scaling said reconstructed transform domain luma data and said reconstructed spatial domain chroma data to generate said second compressed video stream using said encoding method.

* * * * *